United States Patent [19]
Edahiro et al.

[11] Patent Number: 5,141,071
[45] Date of Patent: Aug. 25, 1992

[54] FOUR-WHEEL-STEERED VEHICLE CONTROL SYSTEM

[75] Inventors: Takeshi Edahiro; Ryuya Akita; Hiroshi Ohmura; Takashi Nakashima; Takeshi Murai; Fumio Kageyama, all of Hiroshima, Japan

[73] Assignee: Mazda Motor Corporation, Hiroshima, Japan

[21] Appl. No.: 668,241

[22] Filed: Mar. 12, 1991

[30] Foreign Application Priority Data

Mar. 13, 1990 [JP] Japan .................... 2-62245
Mar. 30, 1990 [JP] Japan .................... 2-83604

[51] Int. Cl.⁵ .................... B60K 28/16; B62D 7/09
[52] U.S. Cl. .................... 180/197; 180/140; 364/424.05; 364/426.03
[58] Field of Search .............. 180/197, 140; 280/91; 364/424.05, 426.01, 426.02, 426.03

[56] References Cited

U.S. PATENT DOCUMENTS

| | | | |
|---|---|---|---|
| 4,399,886 | 8/1983 | Pollman | 180/197 |
| 4,840,243 | 6/1989 | Hirabayashi et al. | 180/140 |
| 4,941,095 | 7/1990 | Imascki et al. | 280/91 |
| 4,967,859 | 11/1990 | Tomlinson | 280/91 X |
| 5,010,488 | 4/1991 | Ohshita et al. | 280/91 X |
| 5,048,633 | 9/1991 | Takehara et al. | 280/91 X |

FOREIGN PATENT DOCUMENTS

| | | |
|---|---|---|
| 56-135358 | 10/1981 | Japan . |
| 109175 | 4/1989 | Japan ............ 180/197 |
| 109176 | 4/1989 | Japan ............ 180/197 |
| 109181 | 4/1989 | Japan ............ 180/197 |
| 215673 | 8/1989 | Japan ............ 180/197 |
| 136377 | 5/1990 | Japan ............ 180/197 |
| 144261 | 6/1990 | Japan ............ 180/197 |

*Primary Examiner*—Charles A. Marmor
*Assistant Examiner*—Kevin Hurley
*Attorney, Agent, or Firm*—Sixbey, Friedman, Leedom & Ferguson

[57] ABSTRACT

A four-wheel-steered vehicle provided with a slip control mechanism which has a slip ratio sensor for detecting the slip ratio of the wheels and controls slip of wheels of the vehicle when the slip ratio of the wheels reaches a first preset value. The four-wheel steering mechanism turns the rear wheels according to first rear wheel turning characteristics in response to turning of the front wheels when the slip ratio of the wheels is smaller than a second preset value which is smaller than the first preset value and turns the rear wheels according to second rear wheel turning characteristics when the slip ratio reaches the second preset value.

4 Claims, 13 Drawing Sheets

FOUR-WHEEL-STEERED VEHICLE CONTROL SYSTEM

BACKGROUND OF THE INVENTION

1. Field of the Invention

This invention relates to a control system for a four-wheel-steered vehicle provided with a slip control means such as an antilock brake system or a traction control system.

2. Description of the Prior Art

Recently there has been put into practice a four-wheel-steered vehicle in which both the front and rear wheels are turned when the steering wheel is turned. In such a four-wheel-steered vehicle, the rear wheels are turned according to predetermined rear-wheel turning characteristics which determines the rear wheel wheel turning angle ratio (the ratio of the rear wheel turning angle to the front wheel turning angle). Generally, the rear wheels are turned in the same direction as that of the front wheels when the vehicle speed is relatively high and in a direction opposite to that of the front wheels when the vehicle speed is relatively low. In this specification, that the rear wheels are turned in the same direction as that of the front wheels will be expressed as "the rear wheels are turned in the same phase", and that the rear wheels are turned in a direction opposite to that of the front wheels is expressed as "the rear wheels are turned in the reverse phase". When the rear wheel turning angle ratio is positive, the rear wheels are turned in the same phase and when the rear wheel turning angle ratio is negative, the rear wheels are turned in the reverse phase.

Further, there has been known an antilock brake system (to be abbrevitaed as "ABS", hereinbelow) in which braking force is controlled to prevent lock of the wheels when the brakes are applied.

The ABS detects the rotational speeds of all the wheels and calculates the vehicle speed and the slip ratio of each wheel on the basis of the rotational speeds of the wheels. Then the ABS controls the brake fluid pressure so that the slip ratio is kept at a value which will provide the most efficient braking, thereby preventing lock of the wheel. More particularly, the ABS calculates a target vehicle speed to which the vehicle speed is expected to decrease when the vehicle is braked at a target slip ratio which will provide the most efficient braking, and when the slip ratio reaches a predetermined braking-control starting threshold value, the ABS controls the braking force or the brake fluid pressure so that the peripheral speed of the wheel conforms to the target vehicle speed. (See Japanese Unexamined Patent Publication No. 56(1981)-135358, for instance.)

It is said that the slip ratio which will provide the most efficient braking (This slip ratio will be referred to as "the most effective slip ratio", hereinbelow.) is about 15 to 20%. However when said target vehicle speed is determined on the basis of such a slip ratio, the wheels can easily loose gripping force when the brakes are applied during cornering where a cornering force is required, though the most efficient braking may be obtained when the brakes are applied while the vehicle is running straight. That is, during cornering, the steering wheel is turned by an angle which is larger than the angle required to direct the vehicle in a desired direction so that a larger angle of skid is provided to the wheels and the component of the gripping force produced by the angle of skid in the rotating direction of the wheels which is directed toward the center of the turn acts on the wheels as the cornering force. As a result, the gripping force in the rotating direction of the wheels is reduced by the cornering force, and accordingly, when the braking force is controlled during cornering with the most effective slip ratio employed as the target slip ratio as when the vehicle is running straight, the wheels are easily locked since the component of the gripping force in the braking direction is smaller than when the vehicle is running straight.

Accordingly, the target slip ratio is generally set below the most effective slip ratio taking into account braking during cornering.

In the case of the four-wheel-steered vehicle described above, a larger cornering force is obtained when the rear wheels are turned in the same phase. Accordingly, when the rear wheels are turned in the same phase, the target slip ratio can be enlarged so that braking efficiency is improved. On the other hand, if the rear wheel turning angle ratio is corrected on the basis of the slip ratio of the wheels detected by the ABS so that a required cornering force is obtained, the target slip ratio for the braking force control may be large or equal to the most effective slip ratio from the first.

However when the rear wheel turning angle ratio is corrected and the target slip ratio is changed after the ABS begins controlling the braking force during cornering, the braking effect fluctuates during cornering, which is sometimes dangerous.

Accordingly, it is preferred that the rear wheel turning angle ratio be changed before the ABS begins controlling the braking force.

Further, there has been known a traction control system which controls the driving force of the driving wheels when the slip ratio of the driving wheels with respect to the road surface exceeds a preset slip ratio. (See Japanese Unexamined Utility Model Publication No. 60(1985)-60356, for instance.)

Since when the driving force is controlled, part of the driving force is lost, it is preferred that the preset slip ratio be as large as possible. However, when the slip ratio of the driving wheels increases, cornering properties of the vehicle are apt to change especially on a slippery road surface. For example, in a front-wheel drive car, understeer tendency is enhanced when the slip ratio of the front wheels increases, and a in a rear-wheel drive car, oversteer tendency is enhanced when the slip ratio of the rear wheels increases. Accordingly, conventionally the preset slip ratio has been generally set somewhat small taking into account the change in the cornering properties.

In the case of the four-wheel-steered vehicle, by properly correcting the rear wheel turning angle ratio to compensate for the change in the cornering properties, the preset slip ratio can be relatively large and the loss of the driving force can be reduced.

However when the correction of the rear wheel turning angle ratio is effected simultaneously with the initiation of the traction control, the driving force must be abruptly controlled immediately after the initiation of the traction control since the slip ratio of the driving wheels has had a tendency to quickly increase by the time the traction control is initiated, which leads to other loss of the driving force.

Accordingly, it is preferred that the rear wheel turning angle ratio be changed before the traction control system begins controlling the driving force.

As can be understood from the description above, in the four-wheel-steered vehicle provided with a slip control means such as an ABS or a traction control system, it is preferred that the rear wheel turning angle ratio be changed prior to initiation of slip control by the slip control means.

SUMMARY OF THE INVENTION

In view of the foregoing observations and description, the primary object of the present invention is to provide a control system for a four-wheel-steered vehicle provided with a slip control means such as an antilock brake system or a traction control system in which the rear wheel turning angle ratio can be changed prior to initiation of slip control by the slip control means so that the change of the rear wheel turning angle ratio can effectively assist the slip control means in controlling the slip of the wheels during conering of the vehicle.

In accordance with the present invention, there is provided a control system for a vehicle provided with a slip control means which has a slip ratio detecting means for detecting the slip ratio of the wheels and controls slip of wheels of the vehicle when the slip ratio of the wheels as detected by the slip ratio detecting means reaches a first preset value, and a four-wheel steering mechanism having a rear wheel turning mechanism and a four-wheel-steering control means which causes the rear wheel turning mechanism to turn the rear wheels according to first rear wheel turning characteristics in response to turning of the front wheels, said control system characterized by having a rear wheel turning characteristic changing means which controls the four-wheel-steering control means so that it causes the rear wheel turning mechanism to turn the rear wheels according to second rear wheel turning characteristics when the slip ratio of the wheels as detected by the slip ratio detecting means reaches a second preset value which is smaller than said first preset value.

In one embodiment of the present invention, said slip control means is a traction control means which reduces the driving force of the wheels when the slip ratio of the wheels reaches a first preset value, and the rear wheel turning characteristic changing means controls the four-wheel-steering control means so that it causes the rear wheel turning mechanism to turn the rear wheels according to second rear wheel turning characteristics when the slip ratio of the wheels as detected by the slip ratio detecting means reaches a second preset value which is smaller than said first preset value, the second rear wheel turning characteristics being shifted toward the reverse phase side with respect to the first rear wheel turning characteristics in the case where the vehicle is a front-engine front-drive vehicle and toward the same phase side in the case where the vehicle is a front-engine rear-drive vehicle.

In another embodiment of the present invention, said slip control means is an ABS, and the second rear wheel turning characteristics are shifted toward the same phase side with respect to the first rear wheel turning characteristics.

BRIEF OF THE DRAWINGS

FIGS. 1 and 2 are schematic views showing a four-wheel-steered vehicle provided with a control system in accordance with an embodiment of the present invention, FIG. 1 showing the traction control system and FIG. 2 showing the rear wheel turning control system, FIG. 3 is a view showing the rear wheel turning characteristics employed in the embodiment, FIG. 4 is a view showing the relation between the correction value and the slip ratio, FIGS. 5, 6 and 7 are flow charts for illustrating the operation of the control unit, FIG. 8 is a schematic view showing a four-wheel-steered vehicle provided with a control system in accordance with another embodiment of the present invention, FIG. 9 is a view showing the rear wheel turning characteristics employed in the embodiment, FIG. 10 shows the hydraulic control circuit of the ABS, FIG. 11 is a time chart for illustrating the braking control by the ABS, FIG. 12 is a flow chart for illustrating the opration of the total control unit, FIG. 13 is a flow chart for illustrating the opration of the ABS, and FIG. 14 is a flow chart for illustrating the opration of the four-wheel-steering control system.

DESCRIPTION OF THE PREFERRED EMBODIMENTS

Figure 1:
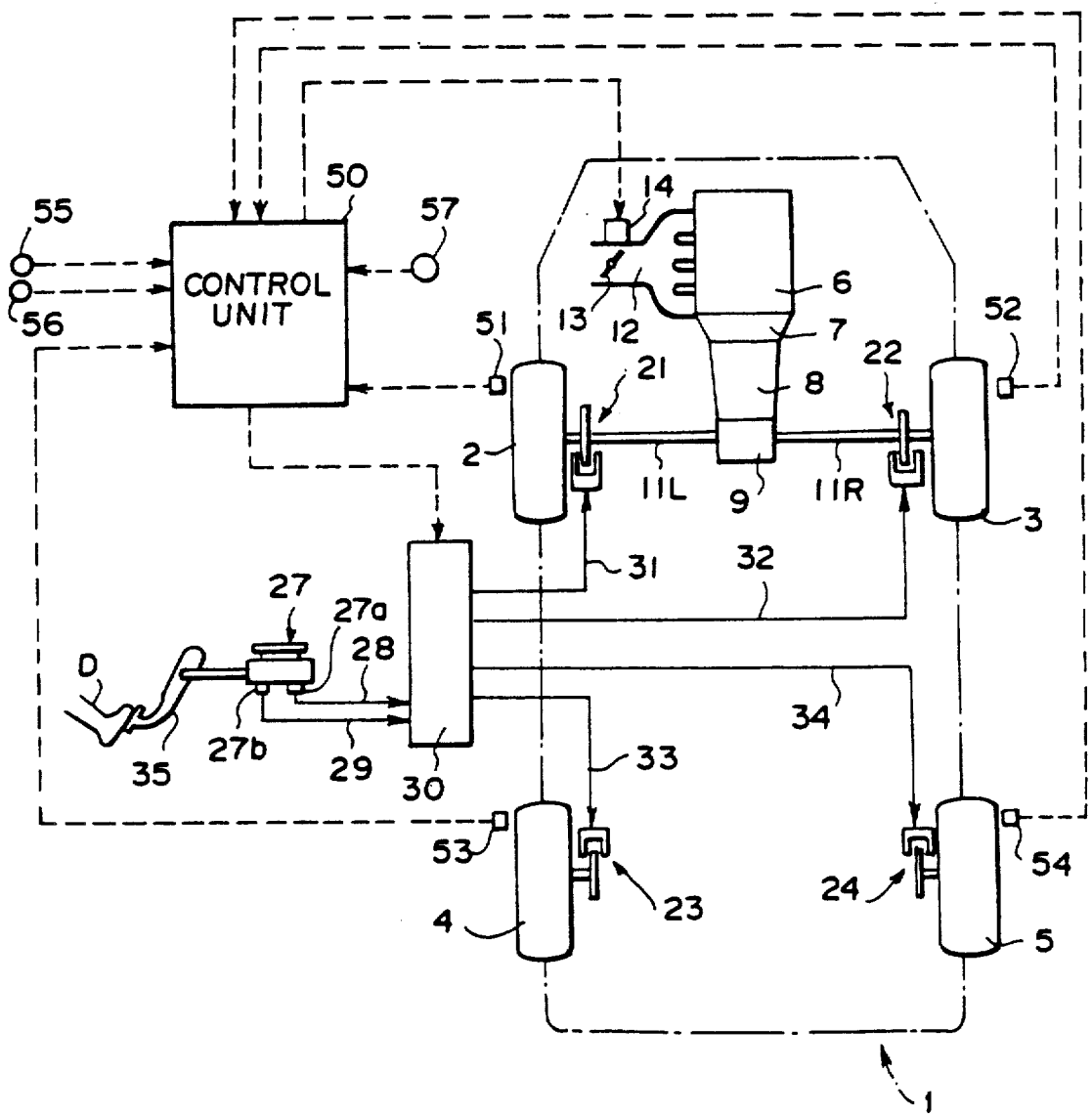

In FIG. 1, a front-engine front-drive vehicle 1 has left and right front wheels 2 and 3 and left and right rear wheels 4 and 5. Reference 6 denotes an engine the output torque of which is transmitted to the front wheels 2 and 3 by way of a clutch 7, a transmission 8, differential 9 and left and right drive shafts 11L and 11R.

The engine 6 is a gasoline engine and is provided with a throttle valve 13 in an intake passage 12. The throttle valve 13 is closed and opened electro-magnetically by a throttle actuator 14. As the throttle actuator 14, a DC motor, a stepping motor or an actuator which is hydraulically driven and controlled an electro-magnetic means may be used.

The wheels 2 to 5 are respectively provided with disk brakes 21 to 24 each of which is of the well-known structure and is driven by brake fluid pressure fed to a wheel cylinder (not shown). A tandem master cylinder 27 having a pair of discharge ports 27a and 27b produces the brake fluid pressure. A pair of brake lines 28 and 29 extending from the respective discharge ports 27a and 27b are connected to a brake fluid pressure control unit 30. The brakes 21 to 24 are separately connected to the brake fluid pressure control unit 30 by for lines 31 to 34. The master cylinder 27 produces brake fluid pressure according to the amount of depression of a brake pedal 35 by a driver D.

The brake fluid pressure control unit 30 comprises an oil pump, electro-magnetic valves and can separately control the brake fluid pressures applied to the respective brakes 21 to 24. Such a structure of the brake fluid pressure control unit 30 has been used in the conventional traction control systems and is well known, and accordingly, will not be described in detail here.

Figure 2:
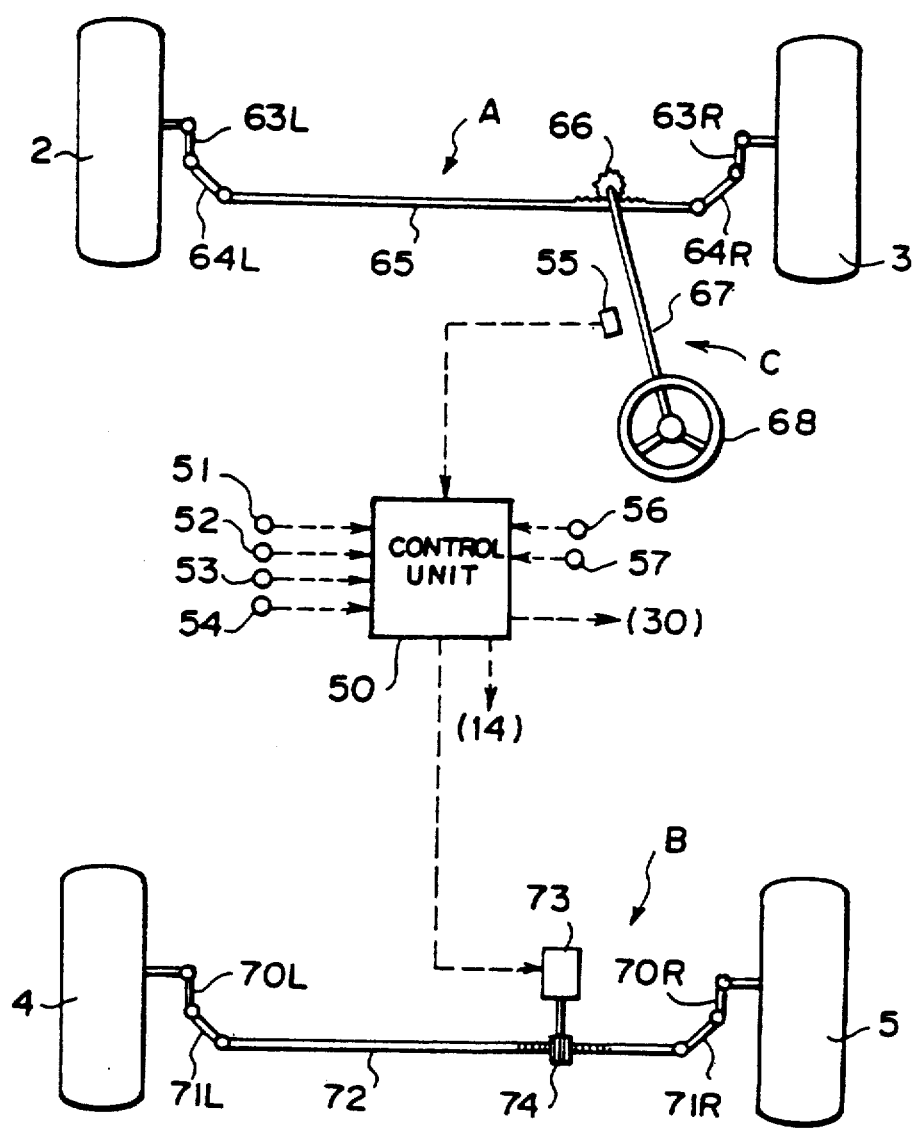

The vehicle 1 is a four-wheel-steered vehicle and has a front wheel turning mechanism A, a rear wheel turning mechanism B and a steering system C as shown in FIG. 2. The front wheel turning mechanism A comprises a left and right knuckle arms 63L and 63R, a left and right tie rods 64L and 64R and a front wheel turning rod 65 which connects the tie rods 64L and 64R. The steering mechanism C comprises a steering wheel 68 and a steering shaft 67 and is connected to the front wheel turning mechansim A by way of a rack-and-pinion mechanisn 66.

The rear wheel turning mechanism B comprises a left and right knuckle arms 70L and 70R, a left and right tie rods 71L and 71R and a rear wheel turning rod 72 which connects the tie rods 71L and 71R. An electric motor 73 is connected to the rear wheel turning rod 72 by way of a rack-and-pinion mechanism 74. When the electric motor 73 is energized, the rear wheels 4 and 5 are turned left or right according to the direction of rotation of the motor 73.

Reference numeral 50 in FIG. 1 denotes a control unit which comprises a microcomputer and controls the rear wheel and the driving force in combination. Signals from wheel speed sensors 51 to 54 which detect the rotational speeds of the wheels 2 to 5, a front wheel turning angle sensor 55 which detects the turning angle of the front wheels 2 and 3 by way of the turning angle of the steering wheel 68, a vehicle speed sensor 56 and an accelerator position sensor 57 which detects the amount of depression of the accelerator pedal (not shown) are input into the control unit 50. The control unit 50 is of a well-known structure and comprises a CPU, a ROM, a RAM, a CLOCK, an input/output interface, an A/D convertor a D/A convertor and the like as needed. Maps and the like which will be described later are stored in the ROM.

Normally the control unit 50 determines a target throttle opening on the basis of the amount of depression as detected by the accelerator position sensor 57 according to basic throttle opening characteristics which has been prepared and stored in the control unit 50, and controls the actuator 14 so that the actual throttle opening converges on the target throttle opening.

The traction control by the control unit 50 will be described, hereinbelow.

In the traction control, the slip ratio S of the driving wheels (front wheels 2 and 3 in this particular embodiment) is calculated according to the following formula.

$$S = (WD - WL)/WD \quad (1)$$

wherein WD represents the rotational speeds of the front or driving wheels 2 and 3 and WL represents the rotational speed of the rear or driven wheels 4 and 5 (the vehicle speed). As the rotational speed of the driven wheels, an average of the rotational speeds of the rear wheels 4 and 5 is employed. As can be understood from formula (1), as the slip ratio S increases, slip of the driving wheels with respect to the road surface increases.

When the slip ratio S exceeds a first preset slip ratio (e.g., 0.2), the control unit 50 begins the traction control and reduces the torque to be transmittes to the front wheels 2 and 3. The control unit 50 reduces the torque by reducing the engine output torque by reducing the throttle opening (not according to the basic throttle opening characteristics) and by applying brakes 21 to 24. The reduction of the torque is effected so that the slip ratio S converges on a target slip ratio (e.g., 0.06). When the slip ratio S is relatively large (e.g., not less than 0.09), the control unit 50 reduces the torque both by reduction of the engine output torque and by application of the brakes. When the slip ratio S is less than 0.09, the control unit 50 reduces the torque solely by reduction of the engine output torque. During the traction control, the throttle opening and the brake fluid pressure are feedback-controlled so that the slip ratio S converges on the target slip ration.

The traction control is interrupted, for instance, when the accelerator pedal is released, when the vehicle speed falls below a predetermined value, and when the throttle opening determined according to the basic throttle opening characteristics becomes smaller than that determined by the traction control.

The rear wheel turning control by the control unit 50 will be described, hereinbelow.

Figure 3:
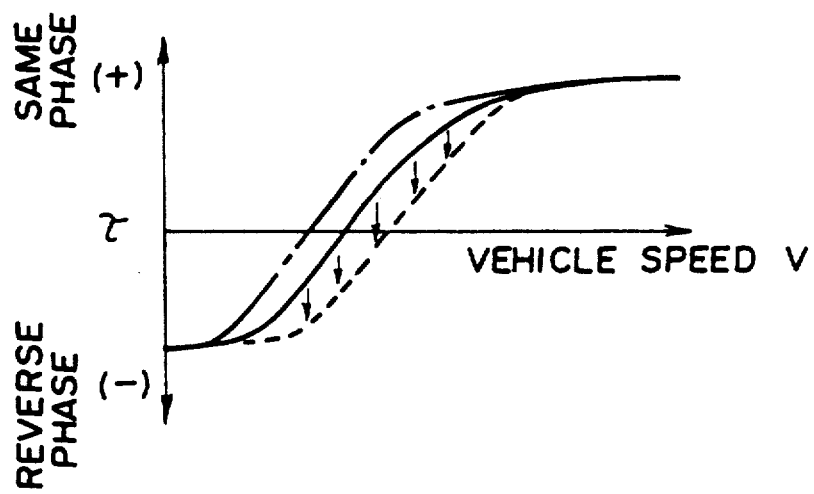

The control unit 50 causes the rear wheel turning mechanism B to turn the rear wheels 4 and 5 according to the rear wheel turning characteristics shown by the solid line in FIG. 3. In the rear wheel turning characteristics, the rear wheel turning angle ratio $\tau 0$ ($=\theta R/\theta F$ wherein $\theta R$ and $\theta F$ respectively represent the rear wheel turning angle and the front wheel turning angle) for a given vehicle speed V is given as a function of the vehicle speed V and the front wheel turning angle $\theta F$. A target rear wheel turning angle is obtained by multiplying the rear wheel turning angle ratio $\tau$ by the front wheel turning angle $\theta F$. The control unit 50 outputs a control signal according to the target rear wheel turning angle thus obtained to the motor 73, thereby turning the rear wheels 4 and 5. Though not shown, a rear wheel turning angle sensor is provided, and the motor 73 is feedback-controlled so that the rear wheel turning angle converges on the target rear wheel turning angle.

Figure 4:
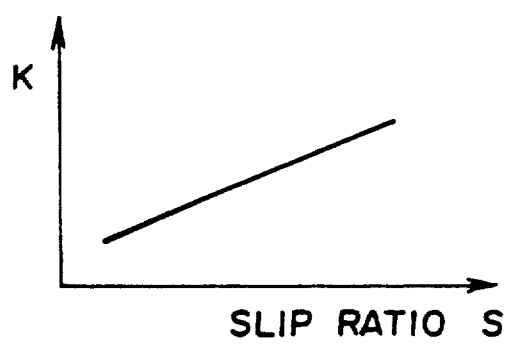

Further, when the slip ratio S of the driving wheels 2 and 3 exceeds a second preset slip ratio (e.g., 0.18) less than the first preset value, the control unit 50 corrects the rear wheel turning characteristics toward the reverse phase side as shown by the broken line in FIG. 3, i.e., so that the rear wheel turning angle ratio $\theta R$ for a given vehicle speed V is smaller than according to the basic rear wheel turning characteristics shown by the solid line in FIG. 3. This correction is effected on the basis of a correction value K which is increased with increase in the slip ratio S as shown in FIG. 4. That is, the rear wheel turning characteristics is shifted toward the reverse phase side by the value of K. The correction value K is changed also according to the vehicle speed V.

The control which executed by the control unit 50 will be described in detail with reference to the flow charts shown in FIGS. 5 to 7, hereinbelow.

Figure 5:
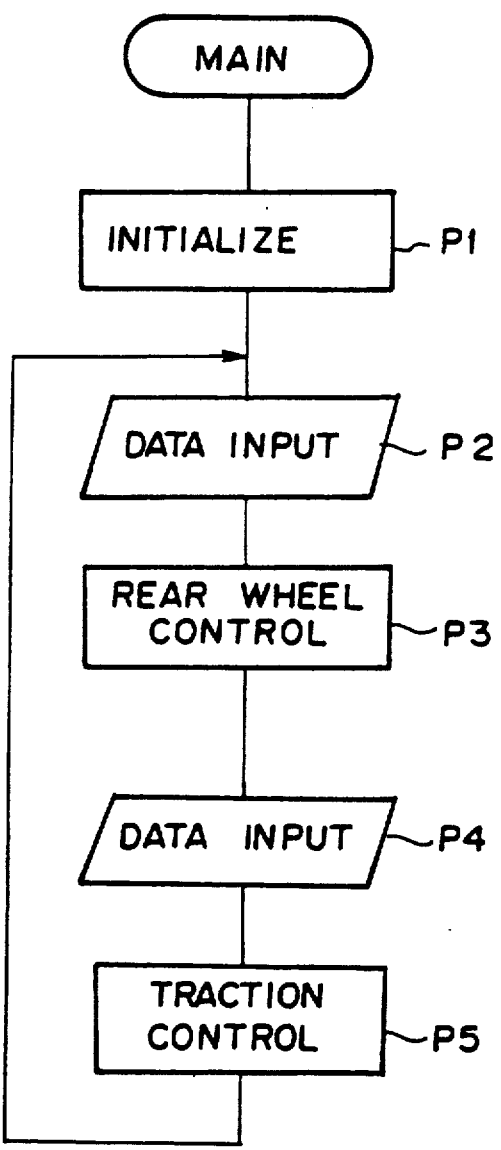

In FIG. 5, the system is initialized in step P1, and the control unit 50 reads signals from the sensors 51 to 57 in step P2. Then the control unit 50 begins the rear wheel turning control in step P3, and then begins the traction control in step P5 after further reading the signals in step P4.

Figure 6:
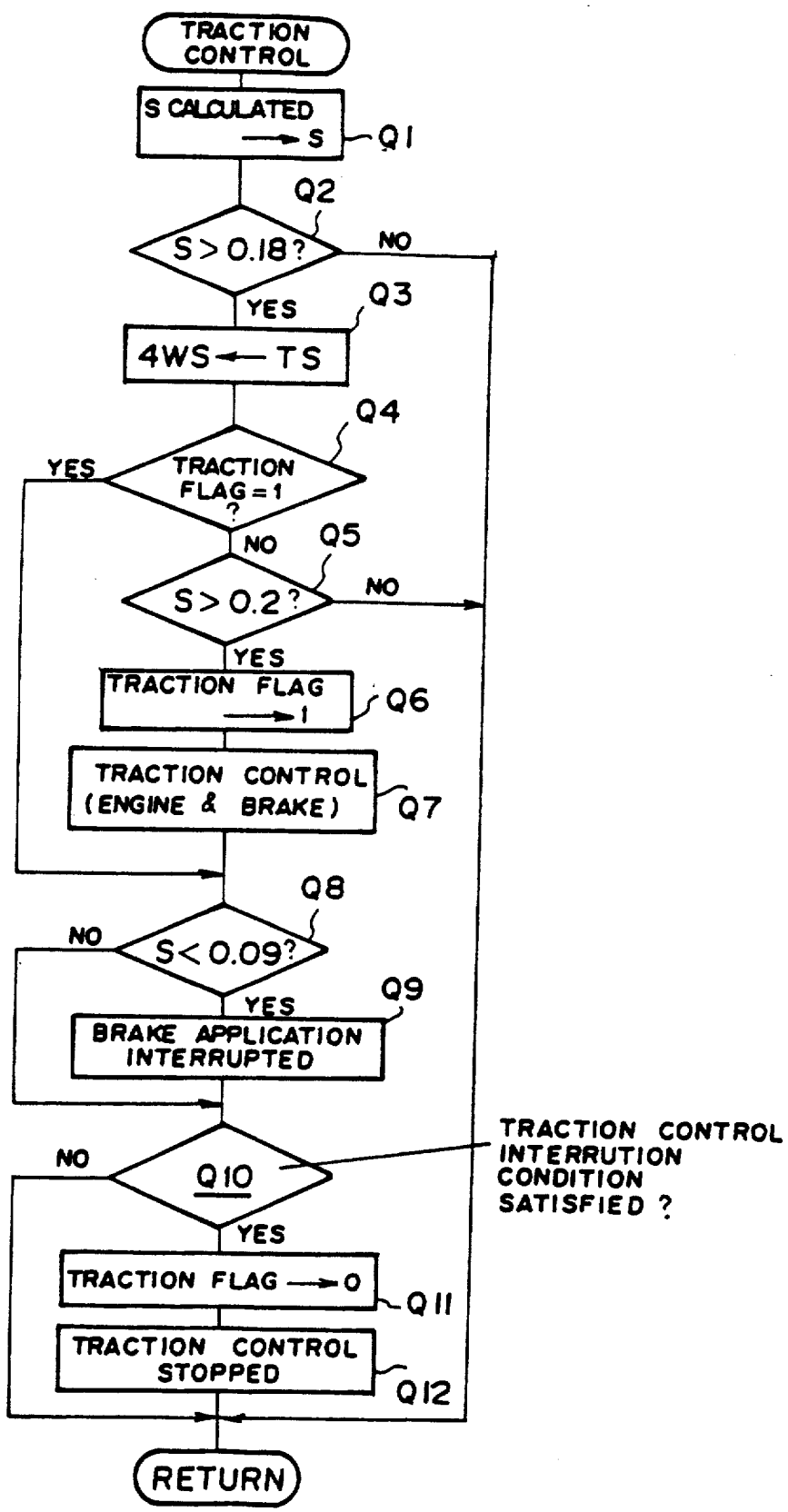

The traction control in step P5 is executed in the manner shown in FIG. 6.

In step Q1, the control unit 50 calculates the slip ratio S of the driving wheels according to the formula (1) described above. Then in step Q2, the control unit 50 determines whether the slip ratio S is larger than the second preset slip ratio 0.18. When it is determined that the former is not larger than the latter, the control unit 50 returns to step Q1 and caluclates the slip ratio S again. Otherwise, the control unit 50 proceeds to step Q3 and outputs a traction control notice signal TS which notify beforehand that the traction control will be started soon. The traction control notice signal TS is used as a signal for starting the rear wheel turning characteristic correction control as will be described later.

Then the control unit 50 determines in step Q4 whether a traction flag is 1. That the traction flag is 1 means that the traction control is being effected. When it is determined in step Q4 that the traction flag is not 1, the control unit 50 determines in step Q5 whether the slip ratio S is larger than the first preset slip ratio 0.2. When it is determined that the slip ratio S is larger than the first preset slip ratio 0.2, the control unit 50 begins the traction control by reduction of the engine output torque and application of the brakes 21 to 24 after setting the traction flag to 1 in step Q6. (step Q7)

Then the control unit 50 proceeds to step Q8 and determines whether the slip ratio S is smaller than 0.09. When it is determined in step Q4 that the traction flag is 1, the control unit 50 directly proceeds to step Q8 from step Q4. When it is determined in step Q8 that the slip ratio S is smaller than 0.09, the control unit 50 interrupts the traction control by application of the brakes in step Q9 and proceeds to step Q10. When it is determined in step Q8 that the slip ratio S is not smaller than 0.09, the control unit 50 directly proceeds to step Q10 (continues the traction control by application of the brakes).

In step Q10, the control unit 50 determines whether the condition for interrupting the traction control has been satisfied. When it is determined that the condition for interrupting the traction control has been satisfied, the control unit 50 stops the traction control after resetting the traction flag to 0 in step Q11. (step Q12)

Figure 7:
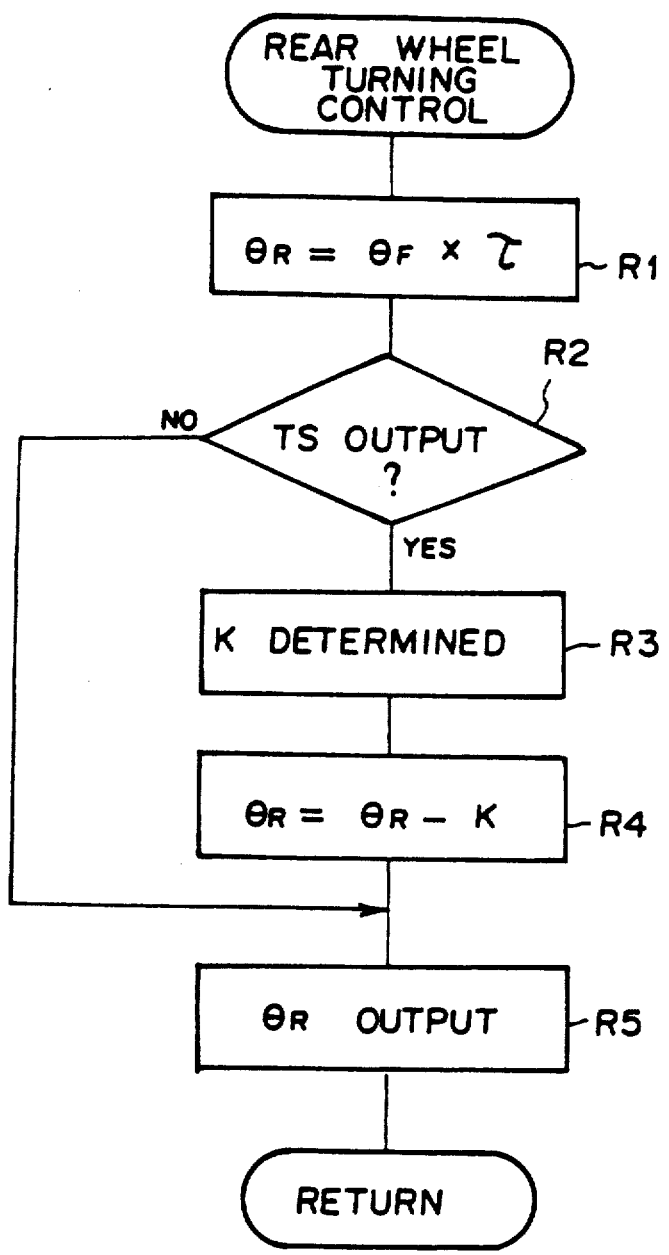

The rear wheel turning control in step P3 is executed in the manner shown in FIG. 7.

The control unit 50 first calculates a target rear wheel turning angle $\theta R$ by multiplying the front wheel turning angle $\theta F$ by the rear wheel turning angle ratio $\tau$ determined on the basis of the vehicle speed V according to the rear wheel turning characteristics shown by the solid line in FIG. 3. (step R1) Then the control unit 50 determines in step R2 whether the traction control notice signal TS has been output. When it is determined in step R2 that the traction control notice signal TS has not been output, the control unit 50 directly proceeds to step R5 and outputs the target rear wheel turning angle $\theta R$ as caluclated in step R1. On the other hand, when it is determined in step R2 that the traction control notice signal TS has been output, the control unit 50 determines the correction value K on the basis of the slip ratio S according to the map shown in FIG. 4, and subtracts the correction value K thus determined from the target rear wheel turning angle $\theta R$ calculated in step R1, and outputs the value of the target rear wheel turning angle $\theta R$ thus obtained as the target rear wheel turning angle $\theta R$. (steps R3, R4 and R5)

As can be understood from the description above, in the control system of this embodiment, when the slip ratio S of the front wheels 2 and 3 (driving wheels) reaches the second preset slip ratio 0.18 which is smaller than the first preset slip ratio 0.2 at which the traction control is to be started, the control unit 50 corrects the rear wheel turning characteristics and begins to control the rear wheel turning angle according to the corrected rear wheel turning characteristics prior to initiation of the traction control. Accordingly, the slip ratio S slowly increases to the first preset slip ratio 0.2 and an abrupt reduction of the driving force immediately after initiation of the traction control can be avoided.

Thus, in accordance with this embodiment, change in the cornering properties of the vehicle due to slip of the driving wheels can be suppressed with minimum loss of the driving force.

The correction value K also changes with the vehicle speed V. When the target rear wheel turning angle $\theta R$ is corrected with the correction value K in the manner described above, the rear wheel turning characteristics becomes as shown by the broken line in FIG. 3.

Though, in the embodiment described above, the rear wheel turning characteristics are corrected toward the reverse phase side in order to weaken understeer tendency since, in the case of the front-wheel drive vehicle, the vehicle exhibits understeer tendency when the front wheels or the driving wheels slip. However, in the case of the rear-wheel drive vehicle, it is preferred that the rear wheel turning characteristics be corrected toward the same phase side as shown by the chained line in FIG. 3.

Another embodiment of the present invention in which the present invention is applied to a four-wheel-steered vehicle provided with an ABS will be described with reference to FIGS. 8 to FIG. 14, hereinbelow.

Figure 8:
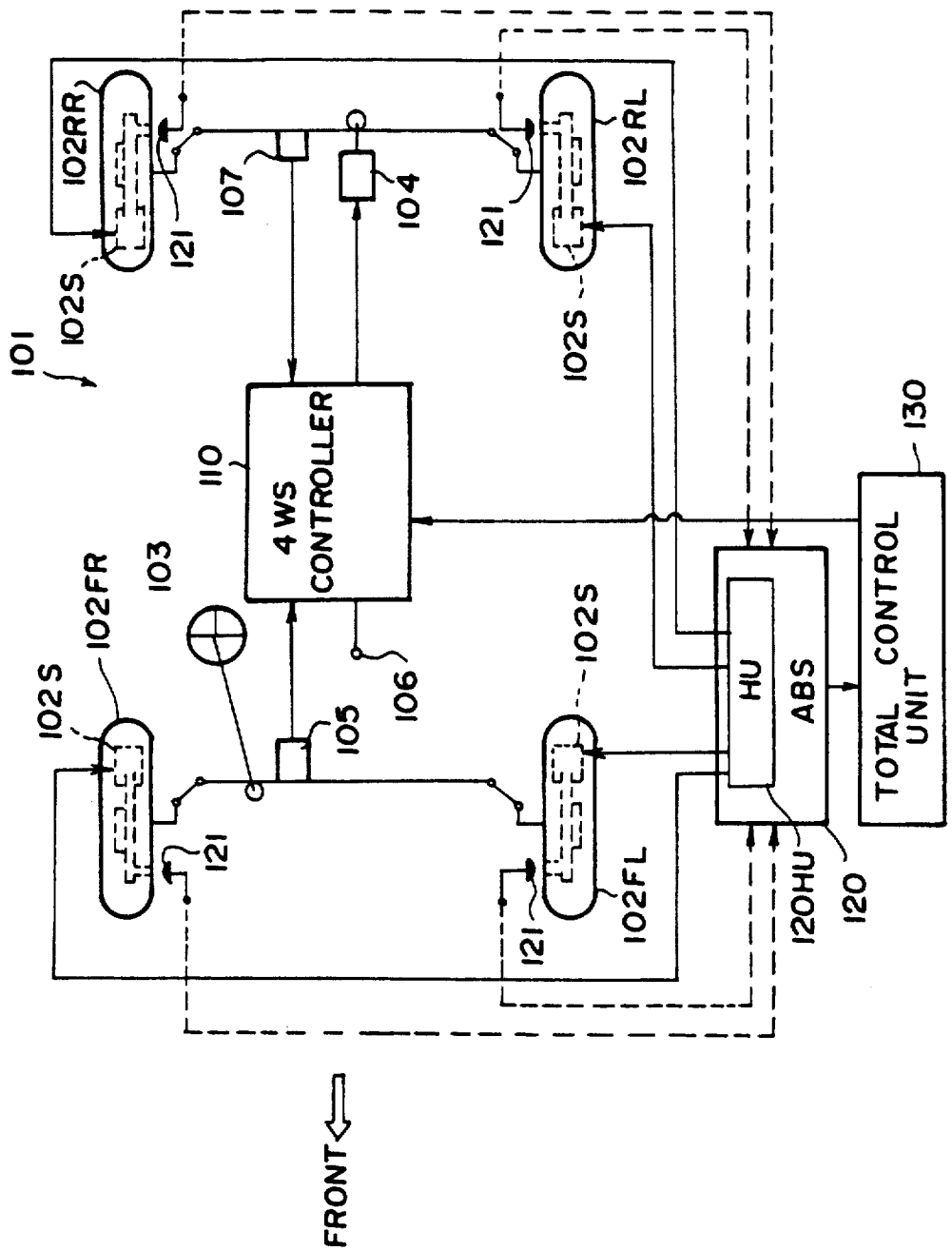

In FIG. 8, a four-wheel-steered vehicle 101 has left and right front wheels 102FL and 102FR and left and right rear wheels 102RL and 102RR and is provided with an ABS 120. The front wheels 102F (102FL and 102FR) are turned in response to turning of a steering wheel 103 by a front wheel turning mechanism which is similar to that shown in FIG. 2. The rear wheels 102R (102RL and 102RR) are turned by a rear wheel turning mechanism, which is similar to that shown in FIG. 2, under the control of a four-wheel-steering controller 110. Reference numeral 104 denotes an electric motor for driving the rear wheel turning rod, and reference numeral 105 denotes a front wheel turning angle sensor, reference numeral 106 denotes a vehicle speed sensor and reference numeral 107 denotes a rear wheel turning angle sensor.

The four-wheel-steering controller 110 normally controls the rear wheel turning mechanism according to basic rear wheel turning characteristics shown by line A in FIG. 9, and controls the same according to corrected rear wheel turning characteristics when required by a total control unit 130 which controls the four-wheel-steering system in combination with the ABS 120 as will be described in detail later. The corrected rear wheel turning characteristics are shifted toward the same phase side with respect to the basic rear wheel turning characteristics.

The ABS 120 controls the brake fluid pressure applied to wheel cylinders 102S provided for the respective wheels 102 so that the most efficient braking takes place without locking the wheels 102.

Wheel speed sensors 121 provided near the respective wheels 102 input to the ABS 120 signals which represent the wheel speeds of the respective wheels 102. As illustrated in the flow chart shown in FIG. 13, the ABS 120 calculates the peripheral speeds of the respective wheels and the vehicle speed (pseudo-vehicle-speed) on the basis of the wheel speeds as represented by the signals from the wheel speed sensors 121. (steps S11 and S12) The ABS 120 further calculates the slip ratios S and the wheel speed accelerations $\dot{V}$ of the respective wheels (steps S13 and S14) and compares them with predetermined braking-control starting threshold values S1 and $\dot{V}1$, and when the slip ratio S is larger than the predetermined braking-control starting threshold value S1 or when the wheel speed acceleration $\dot{V}$ is larger than the predetermined braking-control starting threshold value $\dot{V}1$, the ABS 120 drives a hydraulic unit 120HU to control the braking force. (steps S15 to S17)

Figure 10:
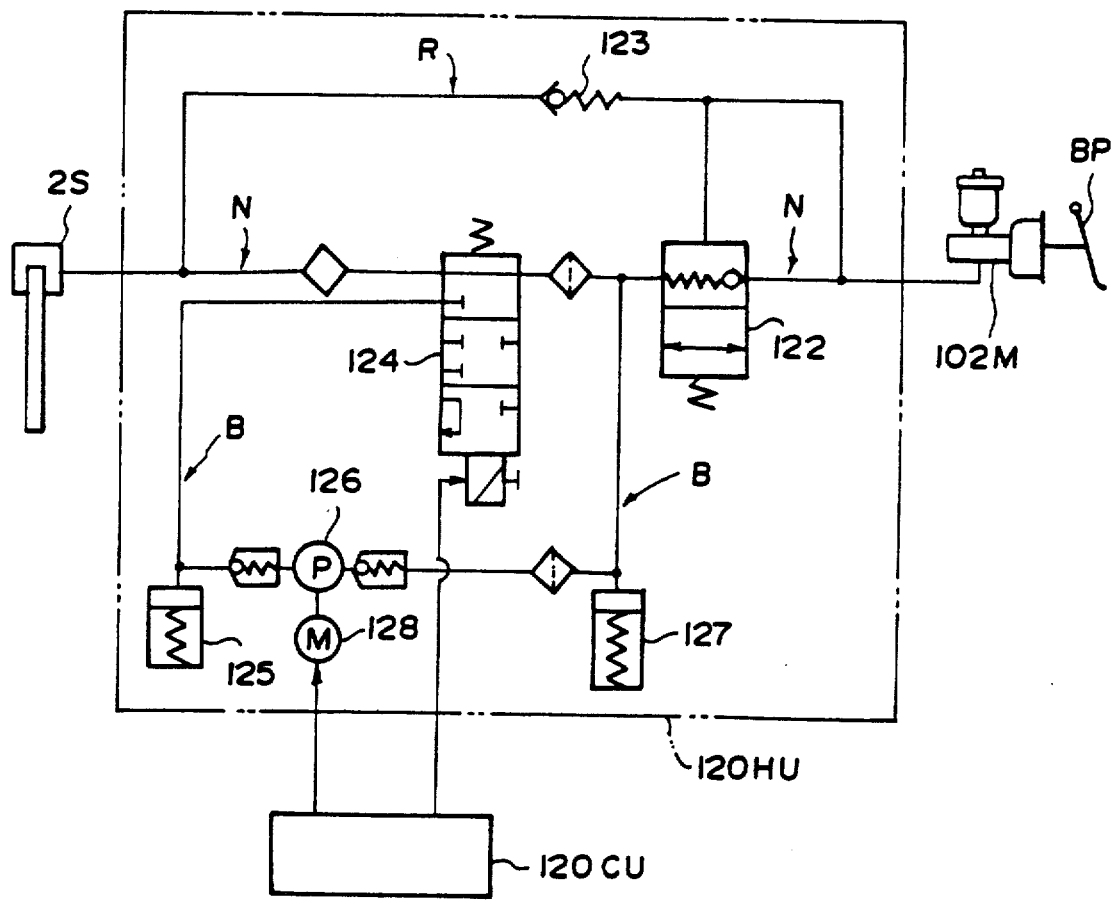

FIG. 10 shows a hydraulic circuit of the hydraulic unit 120HU for one of the wheel cylinders 102S. As shown in FIG. 10, the hydraulic unit 120HU comprises a normal passage N which is used in the normal braking, an ABS passage which is used when the ABS 120 is operating, a return passage R, a floating control valve 122, a check valve 123, a magnet valve 124, a reservoir 125, a pump 126 and an accumulator 127. The hydraulic circuit shown in FIG. 10 is provided for each of the wheels 102.

The normal passage N connects the wheel cylinder 102S to a master cylinder 102M, and the floating control valve 122 and the magnet valve 124 are provided in the normal passage N in series.

The ABS passage B branches off from the normal passage N between the floating control valve 122 and the magnet valve 124 and is connected to the magnet valve 124 by way of the accumulator 127, the pump 126 and the reservoir 125.

The return passage R connects the master cylinder 102M to the wheel cylinder 102S with the check valve 123 intervening therebetween. When the brake is released, the brake fluid is returned to the master cylinder 102M through the return passage R.

The floating control valve 122 provided in the normal passage N permits the brake fluid pressure to be transmitted from the master cylinder 102M toward the magnet valve 124 but basically inhibits the brake fluid pressure from being transmitted in the reverse direction. However when the brake fluid pressure is not higher than a predetermined value, the floating control valve 122 permits the brake fluid pressure to be transmitted in the reverse direction.

The magnet valve 124 has three ports and moves among first to third positions under the control of a control section 120CU. In the first position, the magnet valve 124 communicates the master cylinder 102M with the wheel cylinder 102S by way of the normal passage N, in the second position, the magnet valve 124 communicates the master cylinder 102M with the wheel cylinder 102S by way of the ABS passage B, and in the third position the magnet valve 124 cuts the communication between the master cylinder 102M and the wheel cylinder 102S.

The hydraulic unit 120HU operates as follows.

During the normal braking, the magnet valve 124 is moved to the first position where it communicates the master cylinder 102M with the wheel cylinder 102S by way of the normal passage N. In this state, when a brake pedal BP is pushed down, the brake fluid pressure produced in the master cylinder 102M is transmitted to the wheel cylinder 102S as it is, and applies the brake. When the brake pedal BP is released, the brake fluid returns to the master cylinder 102M through the return passage R.

When the braking force is controlled, the brake fluid pressure applied to the wheel cylinder 102S is reduced, is kept constant at the pressure at that time, and is increased according to the position of the magnet valve 24.

That is, when the magnet valve 124 is moved to the second position in the state where the magnet valve 124 has been in the first position and the master cyliner 102 and the wheel cylinder 102S has been in communication with each other by way of the normal passage N, the ABS passage B is communicated with the wheel cylinder 102S and the brake fluid pressure in the wheel cylinder 102S escapes to the reservoir 125, whereby he brake fluid pressure applied to the wheel cylinder 102S is reduced. When the magnet valve 124 is moved to the third position in the same state, the communication between the master cylinder 102M and the wheel cylinder 102S is cut and the brake fluid pressure applied to the wheel cylinder 102S is kept constant at the pressure at that time. When sufficient brake fluid pressure has been accumulated in the accumulator 125, the brake fluid pressure applied to the wheel cylinder 102S is increased by moving the magnet valve 124 to the first position. An electric motor 128 for operating the pump 126 is energized to accumulate the brake fluid in the reservoir into the accumulator 125 while the brake fluid pressure applied to the wheel cylinder 102S is reduced.

The braking control by the ABS 120 will be described with reference to FIG. 11, hereinbelow.

As described above, when the slip ratio S is larger than the predetermined braking-control starting threshold value S1 or when the wheel speed acceleration $\dot{V}$ is larger than the predetermined braking-control starting threshold value and $\dot{V}1$, the ABS 120 starts the braking control. In FIG. 11, the single-dot chained line represents the vehicle speed when the brake is applied at the braking-control starting threshold slip ratio S1 (braking-control starting vehicle speed), and that the wheel speed falls below the braking-control starting vehicle speed means that the slip ratio S exceeds the braking-control starting threshold slip ratio S1. The broken line represents the braking-control starting threshold wheel speed acceleration $\dot{V}1$ ($= -bo$).

When the brake pedal BP is pushed down, the brake fluid pressure applied to the wheel cylinder 102S is increased and the brake is applied whereby the wheel speed falls and the difference between the wheel speed and the vehicle speed increases. (between points a and b)

When the deceleration (minus acceleration) of the wheel 102 exceeds the braking-control starting threshold wheel speed acceleration $-bo$, or the acceleration falls below the braking-control starting threshold wheel speed acceleration $-bo$ (at point A), the magnet valve 124 is moved to the third position and the brake fluid pressure applied to the wheel cylinder 102S is kept constant. (between points b and c)

As the difference between the wheel speed and the vehicle speed increases, and the wheel speed falls below the braking-control starting vehicle speed (or the braking-control starting threshold slip ratio S1) at point B, it is determined that the wheel 102 tends to lock, the magnet valve 124 is moved to the second position so that the brake fluid pressure applied to the wheel cylinder 102S is reduced, whereby the braking force is reduced, (between points c and d)

When the acceleration of the wheel returns to the braking-control starting threshold wheel speed acceleration $-bo$ by reduction of the brake fluid pressure applied to the wheel cylinder 102S (at point C), the magnet valve 124 is moved to the third position so that the brake fluid pressure applied to the wheel cylinder 102S is kept constant at the pressure at that time. (between points d and e)

When the wheel speed recovers and the acceleration of the wheel 102 exceeds a preset value $+b20$ (at point D) while the brake fluid pressure is kept constant, it is determined that the wheel speed sufficiently recovers and the magnet valve 124 is moved to the first position, thereby increasing the brake fluid pressure. (between points e and f)

When the acceleration of the wheel 102 falls to the preset value +b20 (at point E) as a result of increase in the brake fluid pressure, the magnet valve 124 is moved to the third position so that the brake fluid pressure applied to the wheel cylinder 102S is kept constant at the pressure at that time. (between points f and g)

When the acceleration of the wheel 102 falls below a preset value +b10, the magnet valve 124 is repeatedly moved between the first position where the brake fluid pressure is increased and the third position where the brake fluid pressure is kept constant until the acceleration of the wheel 102 exceeds the braking-control starting threshold wheel speed acceleration −bo. (between points g and h)

When the acceleration of the wheel 102 exceeds the braking-control starting threshold wheel speed acceleration −bo, the cycle described above is repeated.

By this control, the wheel 2 rotates at a speed which will provide most efficient braking.

The total control unit 130 which controls the four-wheel-steering system in combination with the ABS 120 receivs the same information on the slip ratio S and the wheel speed acceleration $\dot{V}$ as those used in the braking control from the ABS 120.

Figure 9:
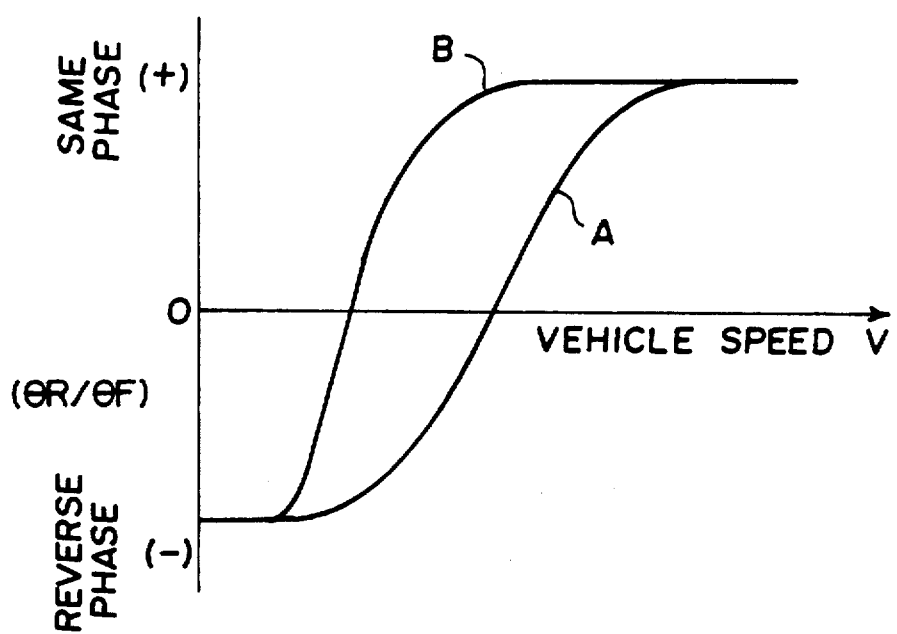
Figure 11:
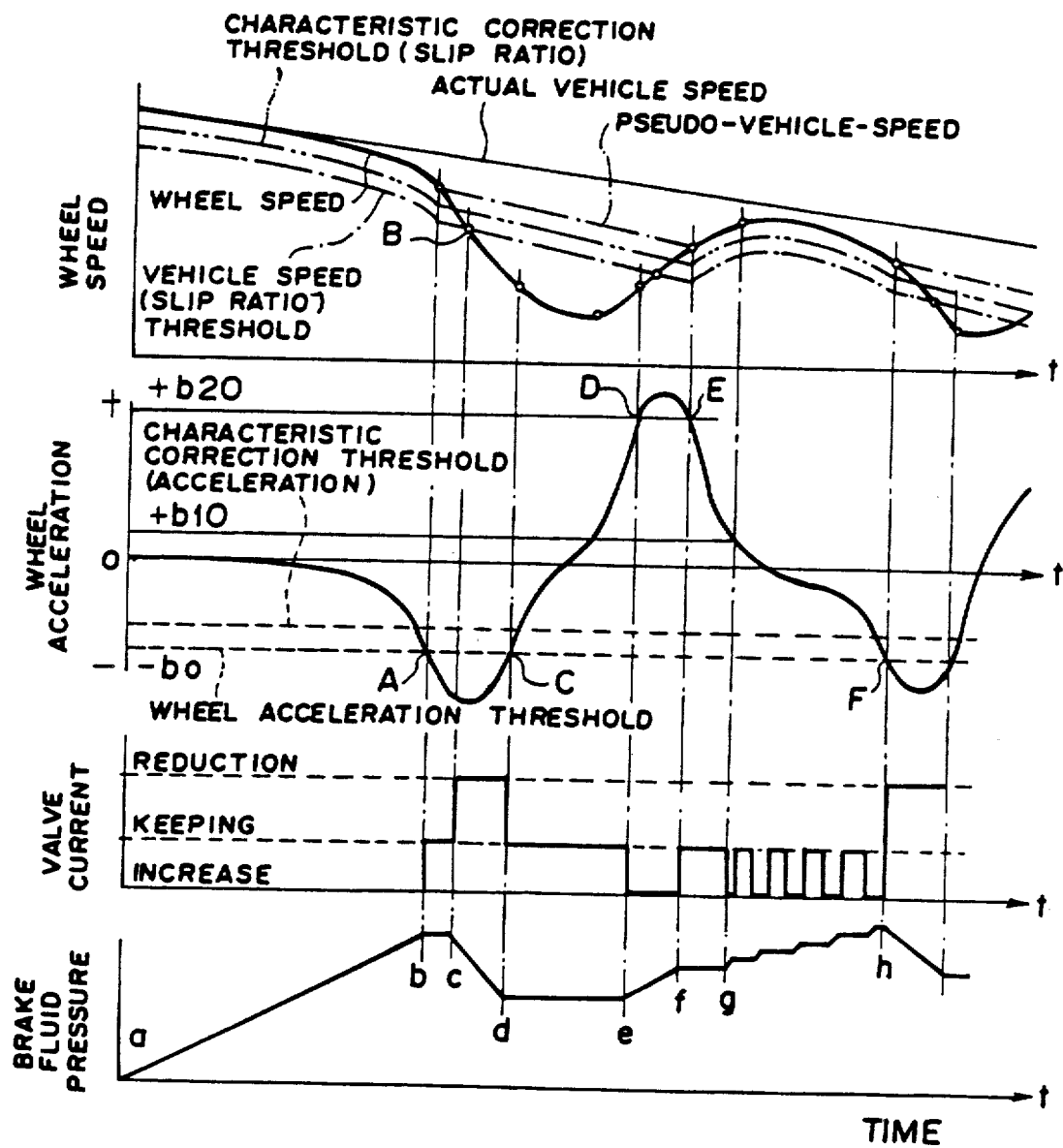

The total control unit 130 commands the four-wheel-steering controller 110 to switch the rear wheel turning characteristics from the basic rear wheel turning characteristics shown by line A in FIG. 9 to the corrected rear wheel turning characteristics shown by line B in FIG. 9 when the slip ratio S of the wheel 102 reaches a rear wheel turning characteristic correction threshold slip ratio So which is smaller than the braking-control starting threshold slip ratio S1 by a predetermined value as shown in FIG. 11, or when the wheel acceleration $\dot{V}$ reaches a rear wheel turning characteristic correction threshold wheel speed acceleration $\dot{V}o$ which is smaller than the braking-control starting threshold wheel speed acceleration $\dot{V}1$ by a predetermined value as shown in FIG. 11.

That is, when the ABS 120 is to effect the braking control, the rear wheel turning characteristics is switched from the basic rear wheel turning characteristics to the corrected rear wheel turning characteristics before the ABS 120 begins the braking control.

Figure 12:
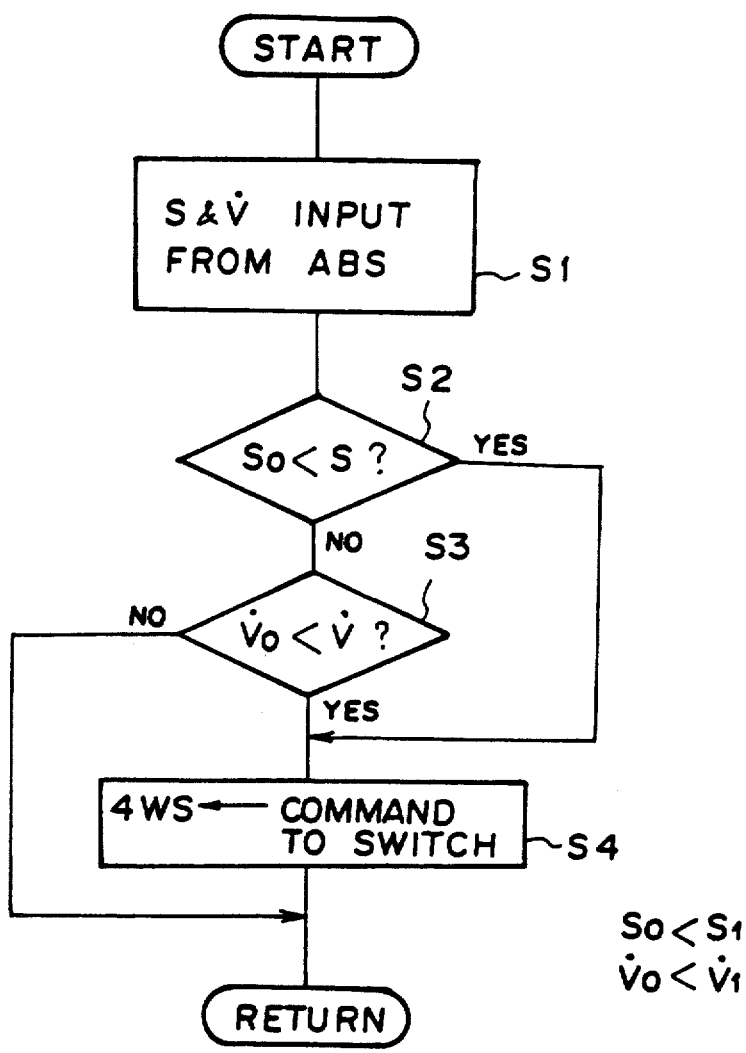
Figure 13:
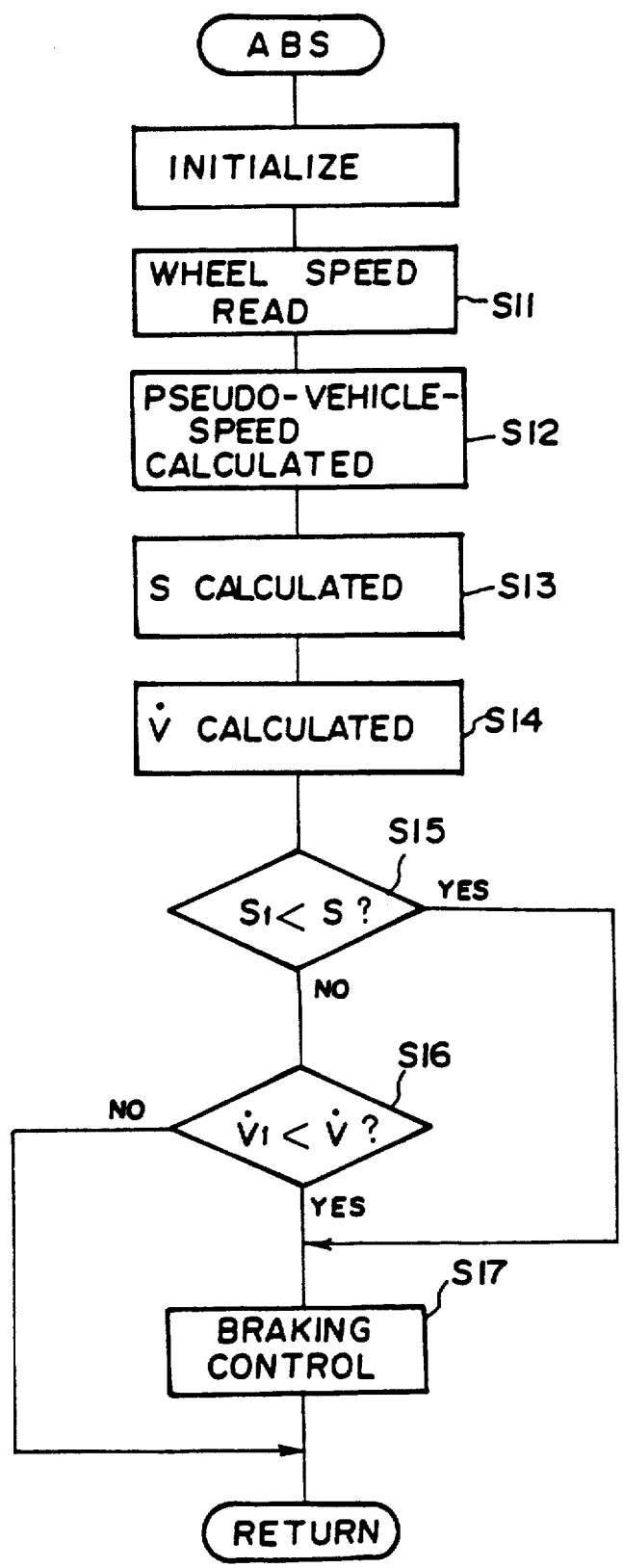

The total control unit 130 controls the four-wheel-steering controller 110 in the manner illustrated by the flow chart shown in FIG. 12.

That is, the total control unit 130 first receivs information on the slip ratio S and the wheel speed acceleration $\dot{V}$ from the ABS 120 (step S1), and compares them respectively with the rear wheel turning characteristic correction threshold slip ratio So and the rear wheel turning characteristic correction threshold wheel speed acceleration $\dot{V}o$ (steps S2 and S3). When the slip ratio S reaches the rear wheel turning characteristic correction threshold slip ratio So or when the wheel acceleration $\dot{V}$ reaches the rear wheel turning characteristic correction threshold wheel speed acceleration $\dot{V}o$, the total control unit 130 commands the four-wheel-steering controller 110 to switch the rear wheel turning characteristics from the basic rear wheel turning characteristics shown by line A in FIG. 9 to the corrected rear wheel turning characteristics shown by line B in FIG. 9.

Figure 14:
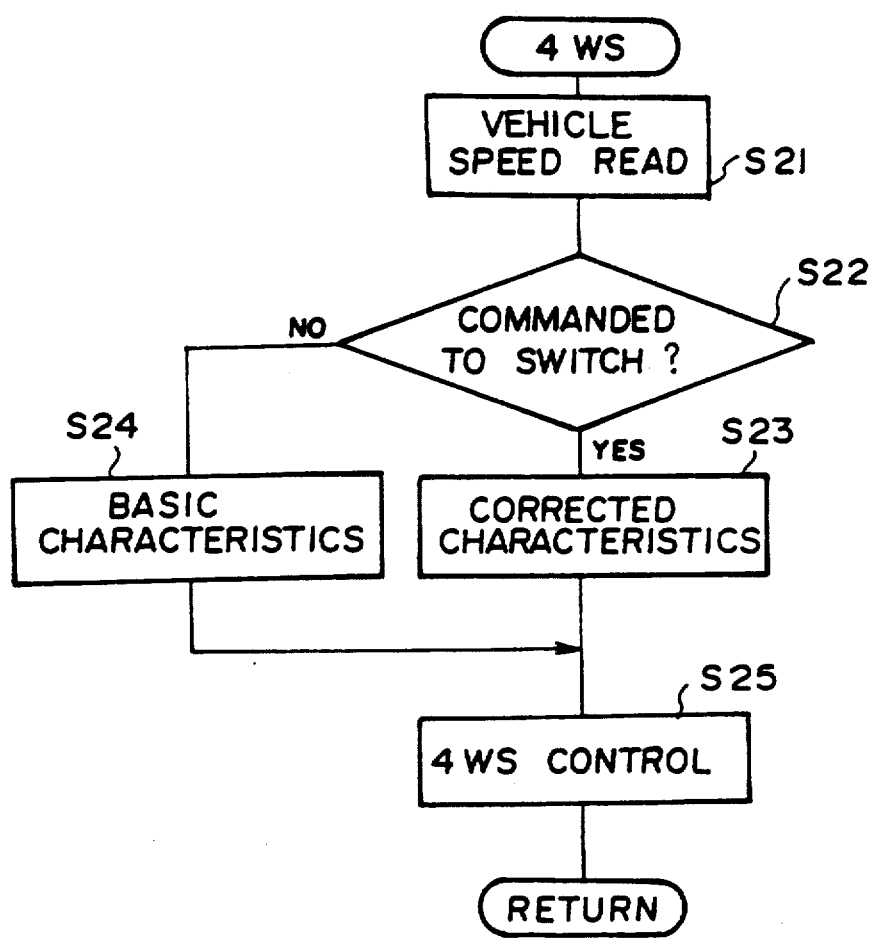

The four-wheel-steering controller 110 switches the rear wheel turning characteristics when commanded by the total control unit 130 in the manner illustrated by the flow chart shown in FIG. 14.

That is, the controller 110 first read the vehicle speed in step S21. Then the controller 110 selects the basic rear wheel turning characteristics or the corrected rear wheel turning characteristics according to whether it is commanded to switch the rear wheel turning characteristics and controls the rear wheel turning mechanism according to the rear wheel turning characteristics selected. (Steps S22 to S25)

As can be understood from the description above, in accordance with the present invention, the rear wheel turning characteristics can be changed prior to the braking control. Accordingly, even if the system is arranged so that the target slip ratio is changed in response to change of the rear wheel turning characteristics, the target slip ratio is not changed in the course of the braking control, whereby the braking control can be effected in a stabilized manner and the most efficient braking can be obtained from the beginning of the braking control.

We claim:

1. A control system for a vehicle provided with a slip control means which has a slip ratio detecting means for detecting the slip ratio of the wheels and controls slip of wheels of the vehicle when the slip ratio of the wheels as detected by the slip ratio detecting means reaches a first preset value, and a four-wheel steering mechanism having a rear wheel turning mechanism and a four-wheel-steering control means which causes the rear wheel turning mechanism to turn the rear wheels according to first rear wheel turning characteristics in response to turning of the front wheels, said control system characterized by having a rear wheel turning characteristic changing means which controls the four-wheel-steering control means so that it causes the rear wheel turning mechanism to turn the rear wheels according to second rear wheel turning characteristics when the slip ratio of the wheels as detected by the slip ratio detecting means reaches a second preset value which is smaller than said first preset value.

2. A control system as defined in claim 1 in which said vehicle is a front-engine front-drive vehicle and said slip control means is a traction control means which reduces the driving force of the wheels when the slip ratio of the front wheels reaches the first preset value, the second rear wheel turning characteristics being shifted toward the reverse phase side with respect to the first rear wheel turning characteristics.

3. A control system as defined in claim 1 in which said vehicle is a front-engine rear-drive vehicle and said slip control means is a traction control means which reduces the driving force of the wheels when the slip ratio of the rear wheels reaches the first preset value, the second rear wheel turning characteristics being shifted toward the same phase side with respect to the first rear wheel turning characteristics.

4. A control system as defined in claim 1 in which said slip control means is an antilock brake system which controls braking force to prevent lock of the wheels when the brakes are applied, and the second rear wheel turning characteristics are shifted toward the same phase side with respect to the first rear wheel turning characteristics.

* * * * *